(12) United States Patent
Tada

(10) Patent No.: US 9,187,039 B2
(45) Date of Patent: Nov. 17, 2015

(54) DOOR MIRROR SUPPORT STRUCTURE

(71) Applicant: KABUSHIKI KAISHA HONDA LOCK, Miyazaki (JP)

(72) Inventor: Masakazu Tada, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 14/435,506

(22) PCT Filed: Aug. 15, 2013

(86) PCT No.: PCT/JP2013/071964
§ 371 (c)(1),
(2) Date: Apr. 14, 2015

(87) PCT Pub. No.: WO2014/064991
PCT Pub. Date: May 1, 2014

(65) Prior Publication Data
US 2015/0266423 A1    Sep. 24, 2015

(30) Foreign Application Priority Data
Oct. 23, 2012   (JP) .................................. 2012-233456

(51) Int. Cl.
| A47G 1/24 | (2006.01) |
| B60R 1/02 | (2006.01) |
| B60R 1/00 | (2006.01) |
| B22D 25/02 | (2006.01) |
| B60R 1/06 | (2006.01) |

(52) U.S. Cl.
CPC ................ *B60R 1/006* (2013.01); *B22D 25/02* (2013.01); *B60R 1/06* (2013.01)

(58) Field of Classification Search
CPC .......... B60R 1/006; B60R 1/06; B60R 1/074; B22D 25/02
See application file for complete search history.

(56) References Cited

U.S. PATENT DOCUMENTS 5,721,646 A * 2/1998 Catlin ................... B60R 1/0605
                                                    248/476
7,448,589 B2 * 11/2008 Blakeman ................ B60R 1/06
                                                    248/475.1

FOREIGN PATENT DOCUMENTS

| JP | H08-183392 A | 7/1996 |
| JP | H11-78801 A | 3/1999 |
| JP | 2002-200939 A | 7/2002 |
| JP | 2002-362226 A | 12/2002 |
| JP | 2009-202680 A | 9/2009 |

* cited by examiner

*Primary Examiner* — Amy Sterling
(74) *Attorney, Agent, or Firm* — Carrier Blackman & Associates, P.C.; Joseph P. Carrier; William D. Blackman

(57) ABSTRACT

A door mirror support structure is provided in which an inner base being die-molded and having a door mirror support portion is mounted on a support plate provided on a door, wherein the inner base has a plurality of frames including at least a pair of vertical frames, a pair of horizontal frames that project outward from lower ends of the vertical frames, a pair of extending frames that have inner ends connected to outer ends of the horizontal frames, extend outward and have outer ends connected to each other, and a linking frame that links the inner ends of the pair of extending frames so as to form the door mirror support portion in cooperation with the extending frames, and the inner base is formed so that spaces are created between the frames.

4 Claims, 6 Drawing Sheets

DOOR MIRROR SUPPORT STRUCTURE

TECHNICAL FIELD

The present invention relates to a door mirror support structure in which an inner base is mounted on a support plate provided on a door, the inner base being die-molded so as to have a door mirror support portion supporting a door mirror main body at a position that is spaced outward from the support plate, and the inner base, apart from the door mirror support portion, is covered by a base cover.

BACKGROUND ART

A door mirror support structure that includes an inner base in which a plate-shaped support plate part mounted on a support plate provided on a door and covering the mounting plate is formed integrally with a plate-shaped arm part that projects sideways from the lower end of the support plate and that can have provided on its extremity part a door mirror support part is known from Patent Document 1.

RELATED ART DOCUMENTS

Patent Documents

Patent Document 1: Japanese Patent Application Laid-open No. 2002-362226

SUMMARY OF THE INVENTION

Problems to be Solved by the Invention

In the arrangement disclosed in Patent Document 1 above, in order to enhance the stiffness a plurality of ribs are formed integrally with the inner base, and the shape of the inner base becomes complicated. As a result, the structure of a die becomes complicated, and misruns of molten metal occur within the die at the time of molding. In order to suppress the misruns within the die at the time of molding, it is necessary to make a runner part bigger and longer and apply sufficient pressure thereto, and there is therefore much waste of material. Furthermore, the surface area and the volume of the entire inner base increase, and this not only causes the weight to increase but also results in an increase in the area to be coated with a rustproofing agent or a paint. Moreover, when the inner base is made of a metal, there is a possibility of the occurrence of rust due to water being easily trapped in a pouch-shaped portion formed as a result of the ribs being provided.

The present invention has been accomplished in light of such circumstances, and it is an object thereof to provide a door mirror support structure for which the shape of an inner base is simplified, the weight is lightened, the die structure is simplified, the cost of materials can be reduced, and the formation of rust can be suppressed even when the inner base is made of metal.

Means for Solving the Problems

In order to attain the above object, according to a first aspect of the present invention, there is provided a door mirror support structure in which an inner base is mounted on a support plate provided on a door, the inner base being die-molded so as to have a door mirror support portion supporting a door mirror main body at a position that is spaced outward from the support plate, and the inner base, apart from the door mirror support portion, is covered by a base cover, characterized in that the inner base has a plurality of frames including at least a pair of vertical frames that extend vertically along an outer face of the support plate and have upper ends connected to each other, a pair of horizontal frames that have inner ends connected to lower ends of the vertical frames and project outward, a pair of extending frames that have inner ends connected to outer ends of the horizontal frames, extend outward, and have outer ends connected to each other, and a linking frame that links the inner ends of the pair of extending frames so as to form the door mirror support portion in cooperation with the extending frames, and the inner base is formed so that spaces are created between the frames.

According to a second aspect of the present invention, in addition to the first aspect, at least one first reinforcing frame linking the pair of vertical frames and at least one second reinforcing frame linking the pair of horizontal frames are formed integrally with the inner base.

According to a third aspect of the present invention, in addition to the second aspect, the vertical frame, the horizontal frame, the extending frame, the linking frame, the first reinforcing frame and the second reinforcing frame are formed so that the external shape of the cross section thereof is polygonal.

According to a fourth aspect of the present invention, in addition to the third aspect, the external shape of the cross section of the vertical frame, the horizontal frame, the extending frame, the linking frame, the first reinforcing frame and the second reinforcing frame is formed from a plurality of straight lines and a plurality of arcs joining the straight lines that are adjacent in a peripheral direction.

Effects of the Invention

In accordance with the first aspect of the present invention, the inner base is formed so as to have a frame structure using a plurality of frames including at least the pair of vertical frames, the pair of horizontal frames, the pair of extending frames, and the linking frame; it is therefore unnecessary to form a plurality of ribs, it is possible by forming a simple shape to simplify the die structure, it is unnecessary to make a runner part bigger and longer in order to suppress misruns, and it is possible to suppress wastage of material. Furthermore, it is possible to keep the surface area and volume of the entire inner base relatively small, thus enabling a reduction in weight to be achieved and reducing the area to be coated with a rustproofing agent or a paint. Moreover, due to the absence of ribs, no pouch-shaped part is formed, it becomes harder for water to build up, and even when the inner base is made of metal, it is possible to suppress the occurrence of rust.

Furthermore, in accordance with the second aspect of the present invention, since at least one first reinforcing frame linking the pair of vertical frames and at least one second reinforcing frame linking the pair of horizontal frames are formed integrally with the inner base, it is possible to impart to the inner base a sufficient strength against vibration or twisting.

In accordance with the third aspect of the present invention, since the external shape of the cross section of the frame forming the inner base is a polygon, an outer face that is formed by a movable die that can be moved toward and away from a molding face of a fixed die is given an angle relative to the fixed die, thus making it possible to facilitate disengagement of the inner base from the die after die-molding is completed and thereby reducing the number of times that coating with a mold release agent is carried out.

Moreover, in accordance with the fourth aspect of the present invention, the external shape of the cross section of the frame is free from sharp edges and can be continuous, thereby making it resistant to peeling off of a coating and thus improving the quality.

EXPLANATION OF REFERENCE NUMERALS AND SYMBOLS

Figure 1:
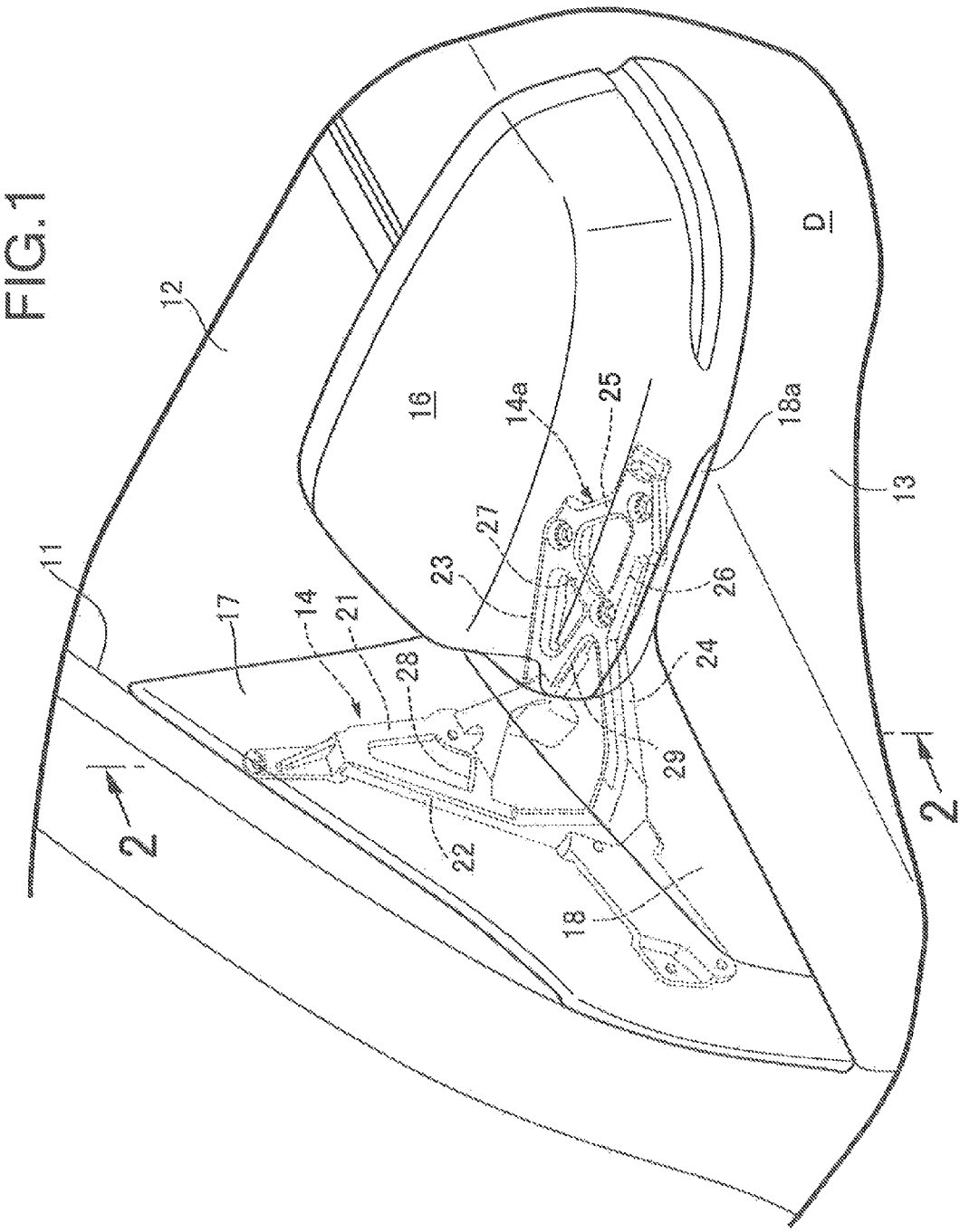
FIG. 1 is a perspective view showing a side face of an essential part of a passenger vehicle.

13a Support plate
14 Inner base
14a Door mirror support portion
16 Door mirror main body
17, 18, 19 Base cover
21, 22 Vertical frame
23, 24 Horizontal frame
25, 26 Extending frame
27 Linking frame
28 First reinforcing frame
29 Second reinforcing frame
43 to 47, 53 to 55 Straight line
48 to 52, 56 to 58 Arc
D Door

MODES FOR CARRYING OUT THE INVENTION

A mode for carrying out the present invention is explained by reference to FIG. 1 to FIG. 7.

Figure 2:
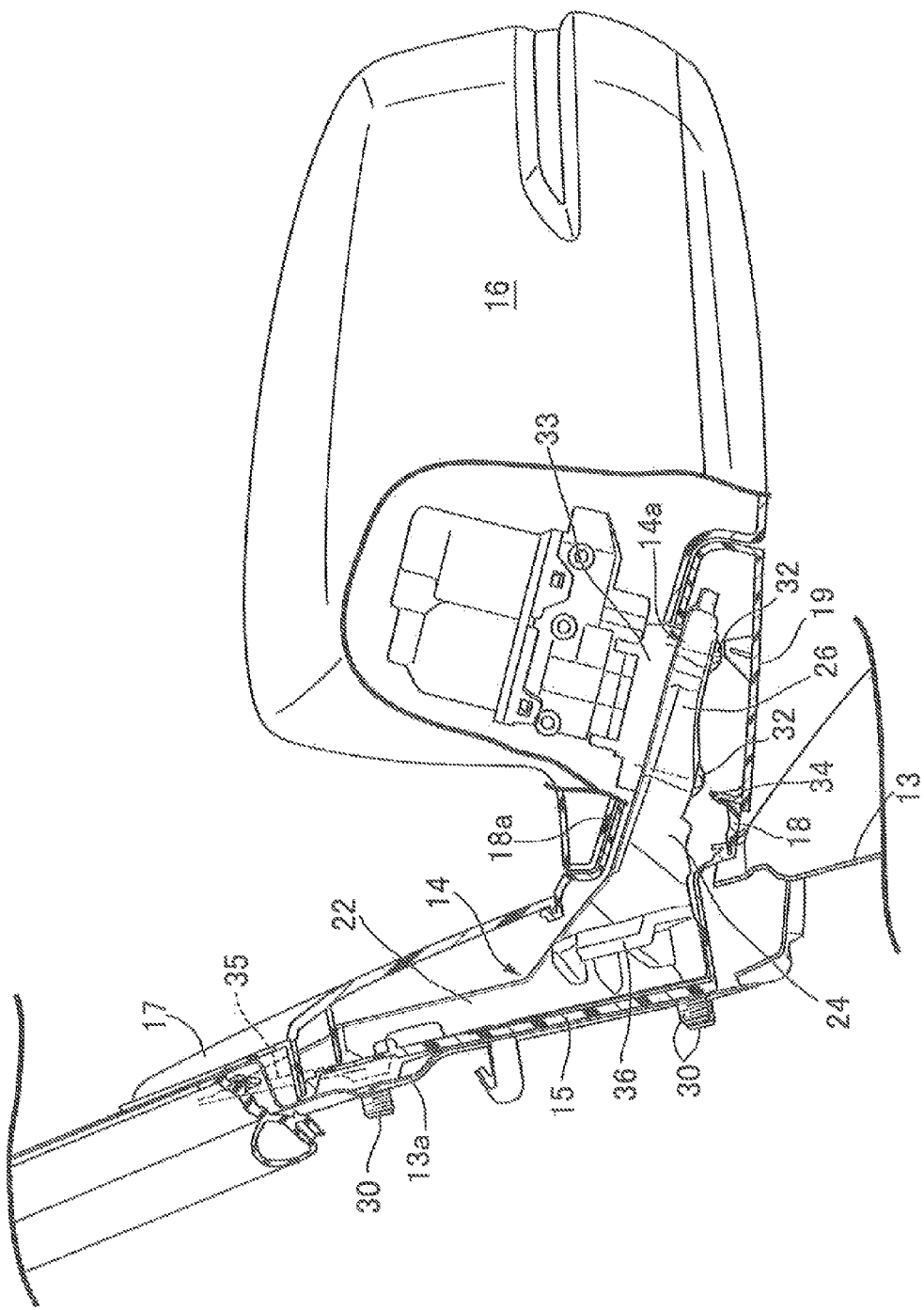
FIG. 2 is a sectional view along line 2-2 in FIG. 1.

Referring first to FIG. 1 and FIG. 2, a front side door D in a passenger vehicle has a window 11 provided in its upper part and has a window glass 12 disposed so that it can be raised and lowered, the window glass 12 being capable of opening and closing the window 11. An inner base 14 die-molded from a light metal such as magnesium is mounted on a triangular support plate 13a provided on an outer panel 13 of the front side door D so as to close a front end part of the window 11, a rubber sheet base 15 being disposed between the inner base 14 and the support plate 13a. A door mirror main body 16 is supported by a door mirror support portion 14a provided integrally with the inner base 14 at a position spaced outward from the support plate 13a. Moreover, the inner base 14, apart from the door mirror support portion 14a, is covered by first, second, and third base covers 17, 18, and 19 made of a synthetic resin.

Figure 3:
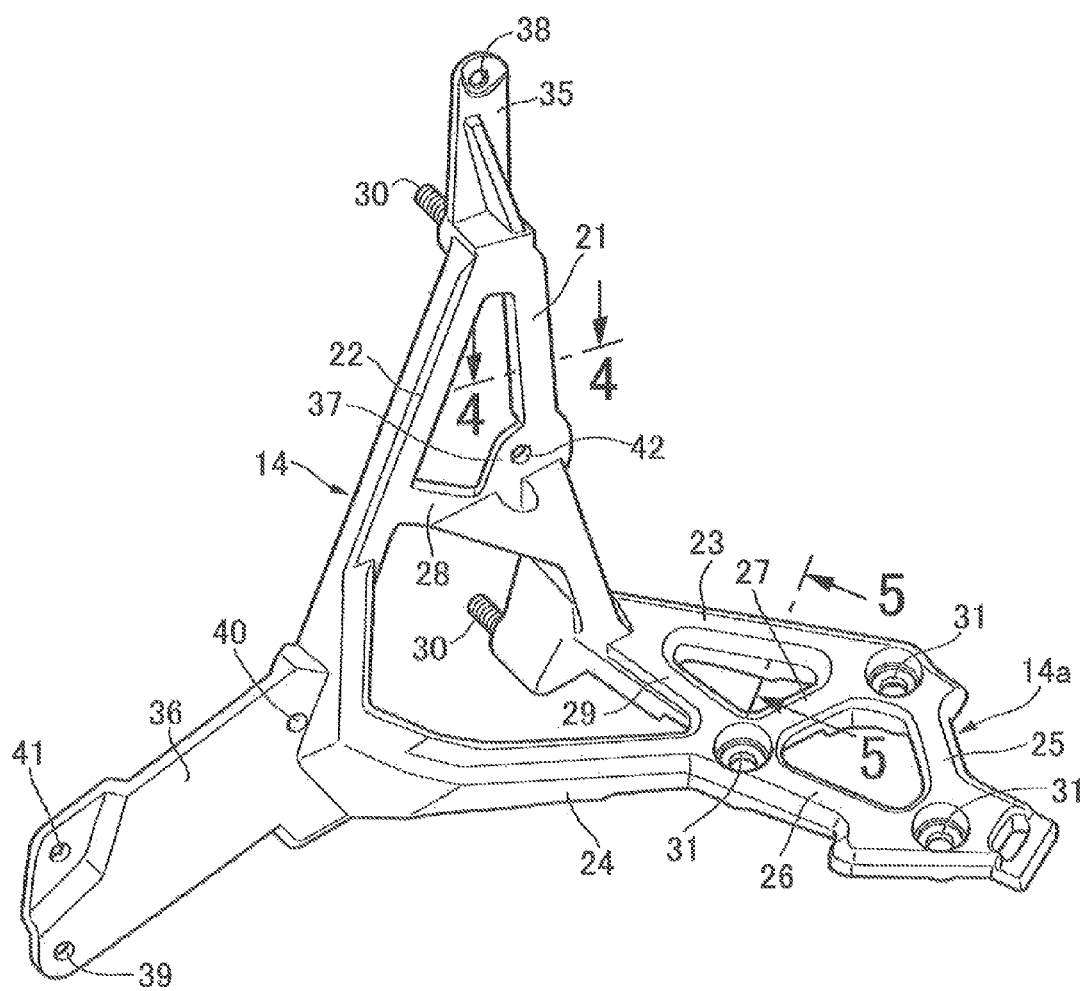
FIG. 3 is a perspective view of an inner base.

Referring in addition to FIG. 3, the inner base 14 is formed so as to include at least a pair of vertical frames 21 and 22 that extend vertically along an outer face of the support plate 13a and have upper ends connected to each other, a pair of horizontal frames 23 and 24 that have inner ends connected to lower ends of the vertical frames 21 and 22 and project outward, a pair of extending frames 25 and 26 that have inner ends connected to outer ends of the pair of horizontal frames 23 and 24, extend outward, and have outer ends connected to each other, and a linking frame 27 that links the inner ends of the pair of extending frames 25 and 26 so as to form the door mirror support portion 14a in cooperation with the extending frames 25 and 26.

Furthermore, the pair of vertical frames 21 and 22, in this embodiment, extend in the vertical direction so that they approach each other in going upward and have their upper ends connected to each other, and the door mirror support portion 14a formed from the extending frames 25 and 26 and the linking frame 27 is formed into a triangular shape in this embodiment.

Moreover, at least one (one in this embodiment) first reinforcing frame 28 linking the pair of vertical frames 21 and 22 and at least one (one in this embodiment) second reinforcing frame 29 linking the pair of horizontal frames 23 and 24 are formed integrally with the inner base 14. That is, the inner base 14 has, in addition to the vertical frames 21 and 22, the horizontal frames 23 and 24, the extending frames 25 and 26, and the linking frame 27, the first reinforcing frame 28 and the second reinforcing frame 29, spaces being created between the frames 21 to 29.

Moreover, in the inner base 14, bolts 30 projecting toward the support plate 13a side are implanted, by mold bonding when die-molding the inner base 14, in a part where the upper ends of the pair of vertical frames 21 and 22 are connected, a part where one vertical frame 21 and one horizontal frame 23 are connected, and a part where the other vertical frame 22 and the other horizontal frame 24 are connected. By screwing nuts (not illustrated) abutting against and engaging with an inner face of the support plate 13a onto the bolts 30 extending through the sheet base 15 disposed between the inner base 14 and the support plate 13a and tightening them the inner base 14 is fixed to the support plate 13a.

Furthermore, in the door mirror support portion 14a, bolt insertion holes 31, 31, and 31 are provided at three positions, that is, a part where the outer ends of the pair of extending frames 25 and 26 are connected and parts where the extending frames 25 and 26 and the linking frame 27 are connected. By screwing bolts 32 inserted through the bolt insertion holes 31 from beneath the door mirror support portion 14a into a bracket 33 of the door mirror main body 16 the door mirror main body 16 is supported on the door mirror support portion 14a.

The first base cover 17 is formed into a shape that covers, of the inner base 14, the pair of vertical frames 21 and 22 and the first reinforcing frame 28 from the outside. Furthermore, the second base cover 18 is provided so as to be connected to a lower part of the first base cover 17 and has a tubular portion 18a covering the horizontal frames 23 and 24, the second reinforcing frame 29, and the door mirror support portion 14a of the inner base 14. An opening 34 via which securing of the door mirror main body 16 to the door mirror support portion 14a is carried out is provided in a lower part of the tubular portion 18a in a part corresponding to the door mirror support portion 14a, and the third base cover 19 is detachably mounted on the second base cover 18 so as to cover the opening 34.

On the other hand, formed integrally with the inner base 14 are a first mounting plate part 35, a second mounting plate part 36, and a flat plate-shaped third mounting plate part 37, the first mounting plate part 35 extending upwardly along an outer face of the support plate 13a from the part where the upper ends of the pair of vertical frames 21 and 22 are connected, the second mounting plate part 36 extending from a lower part of the vertical frame 22, which is on the front side among the two vertical frames 21 and 22, forward along the outer face of the support plate 13a, and the third mounting plate part 37 extending between the vertical frame 21, which is on the rear side among the two vertical frames 21 and 22, and one end of the first reinforcing frame 28. The first mounting plate part 35 is provided with a securing hole 38 for securing an upper part of the first base cover 17, the second mounting plate part 36 is provided with securing holes 39 and 40 for mounting an upper part of the second base cover 18 and a securing hole 41 for securing a front lower part of the first base cover 17 and a front lower part of the second base cover 18 by tightening them together, and the third mounting plate part 37 is provided with a securing hole 42 for securing a rear lower part of the first base cover 17 and a rear lower part of the second base cover 18 by tightening them together.

Figure 4:
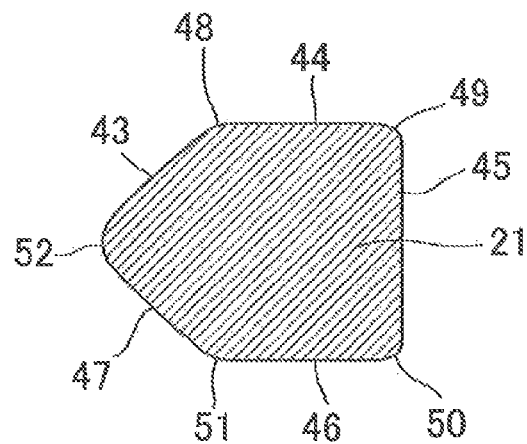
FIG. 4 is a sectional view along line 4-4 in FIG. 3.
Figure 5:
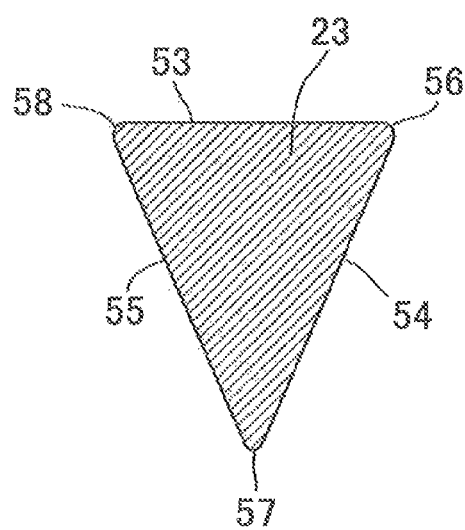
FIG. 5 is a sectional view along line 5-5 in FIG. 3.

The vertical frames 21 and 22, the horizontal frames 23 and 24, the extending frames 25 and 26, the linking frame 27, the first reinforcing frame 28, and the second reinforcing frame 29 of the inner base 14 are formed so as to have a polygonal cross-section external shape; for example, the vertical frame 21 is formed so as to have a pentagonal cross-section external shape as shown in FIG. 4, and for example the horizontal frame 23 is formed so as to have a triangular cross-section external shape as shown in FIG. 5.

Moreover, the external shape of the cross section of the vertical frame 21 is formed from five straight lines 43, 44, 45, 46, and 47 and five arcs 48, 49, 50, 51, and 52 joining the peripherally adjacent straight lines 43, 44; 44, 45; 45, 46; 46, 47; and 47, 43, the external shape of the cross section of the horizontal frame 23 is formed from three straight lines 53, 54, and 55 and three arcs 54, 55, and 56 joining the peripherally adjacent straight lines 53, 54; 54, 55; and 55, 53 and, although not illustrated, the external shapes of the cross sections of the vertical frame 22, the horizontal frame 24, the extending frames 25 and 26, the linking frame 27, and the first and second reinforcing frames 28 and 29 are also formed from a plurality of straight lines and a plurality of arcs joining peripherally adjacent straight lines.

The operation of this embodiment is now explained, since the inner base 14 has the plurality of frames 21 to 29 including at least the pair of vertical frames 21 and 22 that extend vertically along the outer face of the support plate 13a provided on the outer panel 13 of the front side door D and have upper ends connected to each other, the pair of horizontal frames 23 and 24 that have inner ends connected to lower ends of the vertical frames 21 and 22 and project outward, the pair of extending frames 25 and 26 that have inner ends connected to outer ends of the horizontal frames 23 and 24, extend outward, and have outer ends connected to each other, and the linking frame 27 that links the inner ends of the pair of extending frames 25 and 26 so as to form the door mirror support portion 14a in cooperation with the extending frames 25 and 26, and the inner base 14 is formed so that spaces are created between the frames 21 to 29, it is unnecessary to form a plurality of ribs, it is possible by forming a simple shape to simplify the die structure, it is unnecessary to make a runner part bigger and longer in order to suppress misruns within the die at the time of molding, and it is possible to suppress wastage of material. Moreover, since misruns can be avoided, it becomes possible to slowly pour molten material when carrying out molding, it is thus possible to suppress the occurrence of blow holes, which are formed when rapidly pouring a molten material at high pressure, and a good product quality can be obtained. Furthermore, it is possible to keep the surface area and volume of the entire inner base 14 relatively small, thus enabling a reduction in weight to be achieved and reducing the area to be coated with a rustproofing agent or a paint. Moreover, due to the absence of ribs, no pouch-shaped part is formed, it becomes harder for water to build up, and even when the inner base 14 is made of metal, it is possible to suppress the occurrence of rust.

Furthermore, since at least one first reinforcing frame 28 linking the pair of vertical frames 21 and 22 and at least one second reinforcing frame 29 linking the pair of horizontal frames 23 and 24 are formed integrally with the inner base 14, it is possible to impart to the inner base 14 a sufficient strength against vibration or twisting.

Figure 6:
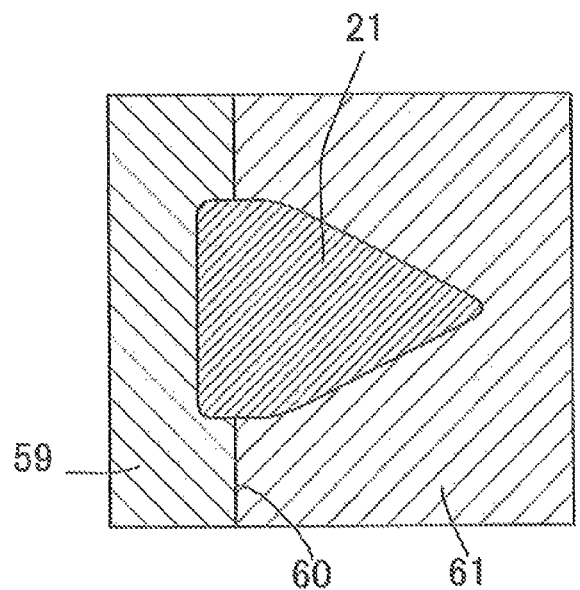
FIG. 6 is a sectional view showing part of a die device for molding a portion of the inner base having a pentagonal cross-section external shape.
Figure 7:
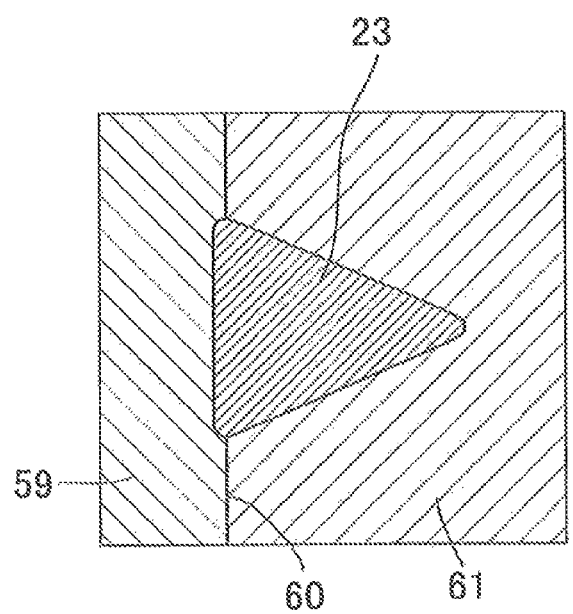
FIG. 7 is a sectional view showing part of a die device for molding a portion of the inner base having a triangular cross-section external shape.

Moreover, since the vertical frames 21 and 22, the horizontal frames 23 and 24, the extending frames 25 and 26, the linking frame 27, the first reinforcing frame 28, and the second reinforcing frame 29 are formed so that the external shape of the cross section thereof is polygonal, as shown in FIG. 6 and FIG. 7, an outer face of the inner base 14 formed by a movable die 61, which can be moved toward and away from a molding face 60 of a fixed die 59, is given an angle relative to the molding face 60 of the fixed die 59, thus making it possible to facilitate disengagement of the inner base 14 from the die after die-molding is completed and thereby reducing the number of times that coating with a mold release agent is carried out.

Furthermore, since the external shapes of the cross sections of the vertical frame 21 and the horizontal frame 23 are formed from the plurality of straight lines 43 to 47 and 53 to 55 and the plurality of arcs 48 to 52 and 56 to 58 joining the straight lines that are adjacent in the peripheral direction, and the external shapes of the cross sections of the vertical frame 22, the horizontal frame 24, the extending frames 25 and 26, the linking frame 27, and the first and second reinforcing frames 28 and 29 are also formed from the plurality of straight lines and the plurality of arcs joining the straight lines that are adjacent in the peripheral direction, the external shapes of the cross sections of the vertical frames 21 and 22, the horizontal frames 23 and 24, the extending frames 25 and 26, the linking frame 27, first reinforcing frame 28, and the second reinforcing frame 29 are free from sharp edges and are continuous, and they thus become resistant to peeling off of a coating, thus improving the quality.

Figure 8:
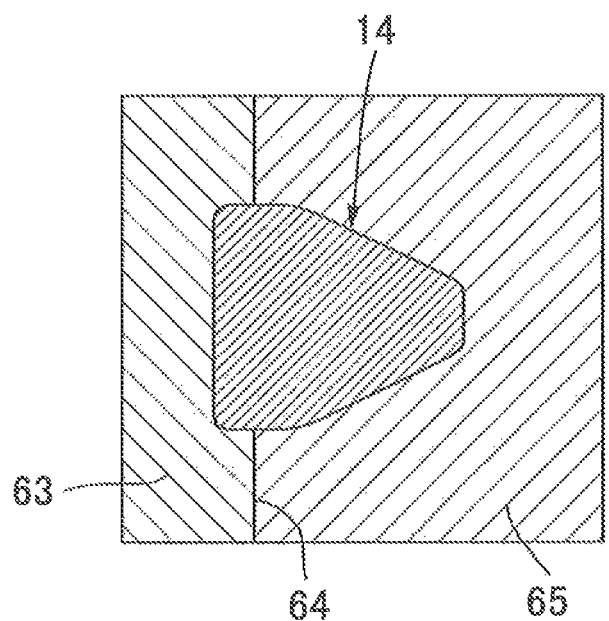
FIG. 8 is a sectional view corresponding to FIG. 6 and FIG. 7 when the external shape of the cross section of the inner base is hexagonal.

As a modification example of the present invention, as shown in FIG. 8, a frame forming part of an inner base 14 may have a hexagonal cross-section external shape, and in this case also an outer face of the inner base 14 formed by a movable die 65 that can be moved toward and away from a molding face 64 of a fixed die 63 is given an angle relative to the molding face 64, thus making it possible to facilitate disengagement of the inner base 14 from the die after die-molding is completed and thereby reducing the number of times that coating with a mold release agent is carried out.

Embodiments of the present invention are explained above, but the present invention is not limited to the above embodiments and may be modified in a variety of ways as long as the modifications do not depart from the spirit and scope thereof.

For example, in the above embodiment the inner base 14 is made of metal, but it may be made of a synthetic resin.

The invention claimed is:

1. A door mirror support structure in which an inner base is mounted on a support plate provided on a door, the inner base being die-molded so as to have a door mirror support portion supporting a door mirror main body at a position that is spaced outward from the support plate, and the inner base, apart from the door mirror support portion, is covered by a base cover, wherein the inner base has a plurality of frames including at least a pair of vertical frames that extend vertically along an outer face of the support plate and have upper ends connected to each other, a pair of horizontal frames that have inner ends connected to lower ends of the vertical frames and project outward, a pair of extending frames that have inner ends connected to outer ends of the horizontal frames, extend outward, and have outer ends connected to each other, and a linking frame that links the inner ends of the pair of extending frames so as to form the door mirror support portion in cooperation with the extending frames, and the inner base is formed so that spaces are created between the frames.

2. The door mirror support structure according to claim 1, wherein at least one first reinforcing frame linking the pair of vertical frames and at least one second reinforcing frame linking the pair of horizontal frames are formed integrally with the inner base.

3. The door mirror support structure according to claim 2, wherein the vertical frame, the horizontal frame, the extending frame, the linking frame, the first reinforcing frame and the second reinforcing frame are formed so that the external shape of the cross section thereof is polygonal.

4. The door mirror support structure according to claim 3, wherein the external shape of the cross section of the vertical frame, the horizontal frame, the extending frame, the linking frame, the first reinforcing frame and the second reinforcing frame is formed from a plurality of straight lines and a plurality of arcs joining the straight lines that are adjacent in a peripheral direction.

* * * * *